United States Patent
Chien

(10) Patent No.: US 7,035,458 B1
(45) Date of Patent: Apr. 25, 2006

(54) METHOD AND SYSTEM FOR FACILITATING TRANSMISSION OF VIDEO DATA OVER A NETWORK

(75) Inventor: Mark C. H. Chien, Danville, CA (US)

(73) Assignee: Pixion, Inc., Pleasanton, CA (US)

( * ) Notice: Subject to any disclaimer, the term of this patent is extended or adjusted under 35 U.S.C. 154(b) by 612 days.

(21) Appl. No.: 10/112,637

(22) Filed: Mar. 29, 2002

Related U.S. Application Data

(60) Provisional application No. 60/353,848, filed on Feb. 1, 2002.

(51) Int. Cl.
*G06K 9/00* (2006.01)
*G06F 13/00* (2006.01)

(52) U.S. Cl. ..................... 382/166; 345/600

(58) Field of Classification Search ............. 382/162, 382/164, 165, 168, 232, 239, 166; 709/203, 709/246; 358/1.15, 523; 345/600; 341/51
See application file for complete search history.

(56) References Cited

U.S. PATENT DOCUMENTS 5,867,112 A * 2/1999 Kost ..................... 341/51
6,189,045 B1 * 2/2001 O'Shea et al. .............. 709/246
2001/0032238 A1 * 10/2001 Cronin et al. ............... 709/203
2002/0051181 A1 * 5/2002 Nishimura .................. 358/1.15
2002/0159632 A1 * 10/2002 Chui et al. .................. 382/168
2003/0007695 A1 * 1/2003 Bossut et al. ............... 382/239

* cited by examiner

Primary Examiner—Andrew W. Johns
Assistant Examiner—Amir Alavi
(74) Attorney, Agent, or Firm—Carr & Ferrell LLP

(57) ABSTRACT

A method for facilitating transmission of video data over a computer network is disclosed. The method comprises the following exemplary steps. First, all the distinct colors in a region are identified. Second, the n most frequently occurring distinct colors are selected, where n is an integer parameter which is less than or equal to sixteen (16). Then, the next 16–n distinct colors are selected from the remaining distinct colors. These next 16–n distinct colors are colors that differ the most from the n selected distinct colors. The sixteen (16) selected distinct colors collectively represent a color map for the region. For each pixel within the region, one of the sixteen (16) selected distinct colors is assigned to that pixel, i.e., each pixel is represented by a 4-bit color. The assignment is based on which one of the sixteen (16) selected distinct colors is closest to the original color of the pixel. Once all the pixels in the region have been assigned their respective distinct colors, the region is now represented by a 4-bit bitmap. The color map and the 4-bit bitmap can then be compressed by a PNG compression algorithm for transmission to the intended destination(s).

24 Claims, 1 Drawing Sheet

METHOD AND SYSTEM FOR FACILITATING TRANSMISSION OF VIDEO DATA OVER A NETWORK

CROSS-REFERENCES TO RELATED APPLICATION(S)

The present application claims the benefit of priority under 35 U.S.C. § 119 from U.S. Provisional Patent Application Ser. No. 60/353,848, entitled "METHOD AND SYSTEM FOR FACILITATING TRANSMISSION OF VIDEO DATA OVER A NETWORK" filed on Feb. 1, 2002, the disclosure of which is hereby incorporated by reference in its entirety for all purposes.

BACKGROUND OF THE INVENTION

In a video meeting conducted over a computer network, such as, the Internet, images on the monitor screen of a presenter are transmitted over the computer network to those of attendees. The faster the transmission rate, the more effective the meeting. When the network connection between the presenter and the attendee involves a modem, the transmission rate very often becomes intolerably slow. For example, using current technology, it sometimes takes over a minute to transmit a full image over a 56K modem from the presenter to the attendee.

Current technology divided the full image on the monitor screen into numerous regions. Each region is made up of pixels and represented by a 8-bit, 16-bit, 24-bit, or 32-bit bitmap, depending on the setting of the screen properties of the monitor. Each pixel is represented by a predetermined number of bits, e.g., 8-bit, 16-bit, 24-bit or 32-bit. The bitmap represents the collective bit representations of all the pixels in a region. The PNG compression algorithm is directly applied to the bitmap of each region. The compressed bitmaps are subsequently transmitted from the presenter to the attendee(s). The compressed bitmaps transmitted in this manner may take a substantial amount of time to reach their intended destinations. Hence, it would be desirable to provide a method and system which is capable of transmitting video data in a more efficient manner so as to reduce transmission time.

SUMMARY OF THE INVENTION

A method for facilitating transmission of video data over a computer network is disclosed. According to an exemplary embodiment, the method comprises the following exemplary steps. First, all the distinct colors in a region are identified. Second, the n most frequently occurring distinct colors are selected, where n is an integer parameter which is less than or equal to sixteen (16). Then, the next 16-n distinct colors are selected from the remaining distinct colors. These next 16-n distinct colors are colors that differ the most from the n selected distinct colors. The sixteen (16) selected distinct colors collectively represent a color map for the region. For each pixel within the region, one of the sixteen (16) selected distinct colors is assigned to that pixel, i.e., each pixel is represented by a 4-bit color. The assignment is based on which one of the sixteen (16) selected distinct colors is closest to the original color of the pixel. Once all the pixels in the region have been assigned their respective distinct colors, the region is now represented by a 4-bit bitmap. The color map and the 4-bit bitmap can then be compressed by a PNG compression algorithm for transmission to the intended destination(s).

In an exemplary embodiment, the method as described above is implemented using computer software.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, wherein like reference numbers indicate identical or functionally similar elements.

DETAILED DESCRIPTION OF THE INVENTION

Figure 1:
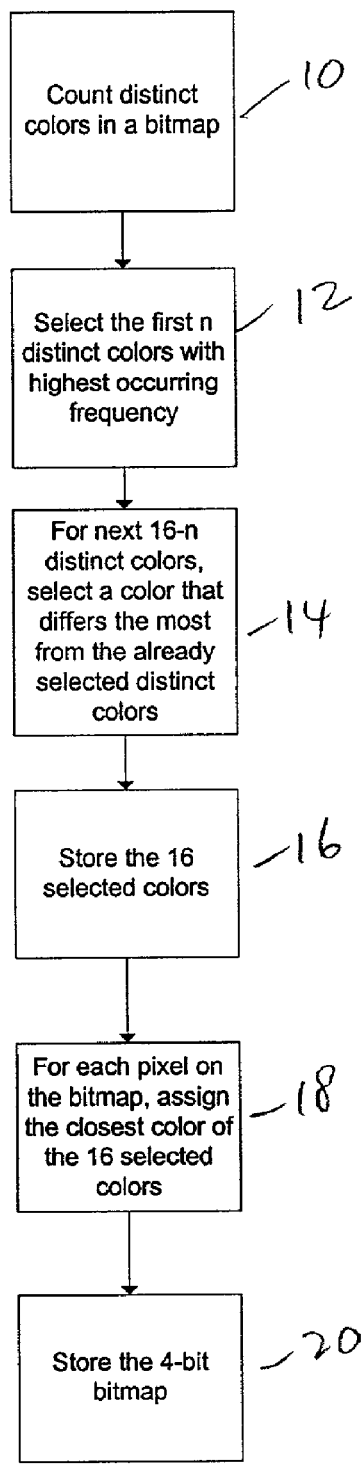
FIG. 1 is a flow diagram illustrating the operation of an exemplary method of the present invention.

The present invention in the form of one or more exemplary embodiments will now be described. According to an exemplary method of the present invention, a 4-bit conversion method, as will be further described below, is applied first to the 8-, 16-, 24- or 32-bit bitmaps before the PNG compression algorithm is applied. This results in converted data having a reduced size. Based on the disclosure provided herein, it will be appreciated by one of ordinary skill in the art that the 4-bit conversion method can be applied to bitmaps of any size.

FIG. 1 is a flow diagram illustrating an exemplary operation of a 4-bit conversion method. Referring to FIG. 1, according to the exemplary method, the 4-bit conversion method is comprised of a number of steps. At step 10, all distinct colors in a bitmap of a region of interest are counted. That is, all pixels in the bitmap are examined to determine all the distinct colors within the region. In this step, two colors are considered to be distinct only if their digital representations differ by more than a predetermined tolerance. The difference between two colors is calculated using a byte-by-byte comparison. With respect to the predetermined tolerance, the level of such tolerance is determined empirically based on the number of distinct colors that are desired to be detected. For example, if more distinct colors are to be detected, then the tolerance may be adjusted to a lower level; on the other hand, if fewer distinct colors are to be detected, the tolerance may be adjusted to a higher level.

As an illustration, consider the case of a 24-bit RGB color representation where each color is represented by 3 bytes. Suppose Color 1 has a digital representation of ABC and Color 2 has a digital representation of DEF, where the respective lengths of A, B, C, D, E, F are one (1) byte. The two colors, Color 1 and Color 2, are considered to be distinct if the difference between the two colors as determined by the following equation: $|A-D|+|B-E|+|C-F|$ (Eq. 1) is greater than a tolerance of, for example, fifty (50). As the foregoing illustrates, the difference between the two colors is calculated by comparing the corresponding bytes of the two colors and summing up the differences collectively. It will be appreciated by one of ordinary skill in the art that Eq. 1 can be adjusted depending on the digital representation of a color.

At step 12, the first n distinct colors that have the highest occurring frequency are selected. In an exemplary embodiment, n is a parameter that is less than or equal to sixteen (16). These n most frequently occurring distinct colors are chosen to ensure that the predominant distinct colors within the bitmap are retained. By retaining the predominant distinct colors, overall feel of the original image is reasonably preserved when a converted version of the original image is transmitted over a computer network for display at its intended destination. Consider, for example, an original image of a painting with large patches of blue and green. By selecting the predominant distinct colors (e.g., blue and green), the overall feel of the painting is reasonably preserved.

At step 14, the next 16-n distinct colors are selected. More specifically, these next 16-n distinct colors are colors that differ the most from the colors that have been selected in step 12. To select these next 16-n distinct colors, each of the remaining distinct colors (i.e., all the distinct colors identified in step 10 minus the n distinct colors that have been selected in step 12) is examined and compared against the distinct colors selected in step 12 using Eq. 1 described above. For example, using Eq. 1, a remaining distinct color is compared to each of the distinct colors selected in step 12. The respective individual differences between this remaining distinct color and the distinct colors selected in step 12 are summed together and recorded for subsequent comparison with results of other remaining distinct colors. The 16-n remaining distinct colors with the highest sums are then selected. Practically, by selecting the next 16-n distinct colors in the foregoing manner, colors which are most different from the predominant colors selected in step 12 are also represented. This is done to ensure that the most distinctive features (in terms of color contrast) in an image are not lost. Using the painting image in the example mentioned above, distinctive features in lighter colors, such as white or yellow, may be arranged in contrast to the larger patches of blue and green. By selecting the remaining distinct colors as described in step 14, the white or yellow can be picked up to preserve a better overall feel of the image.

At step 16, the sixteen (16) distinct colors selected in steps 12 (n distinct colors) and 14 (16-n distinct colors) are stored to a data buffer. The data from the data buffer is to be compressed later by the PNG compression algorithm. These sixteen (16) selected distinct colors collectively represent the color map for the region of interest.

At step 18, for each pixel on the 8-, 16-, 24-, or 32-bit bitmaps, one of the sixteen (16) selected distinct colors is assigned to the pixel that would which will minimize the difference between the assigned distinct color and the original color of the pixel. That is, the original color of each pixel is compared to each one of the sixteen (16) selected distinct colors to determine which one of the sixteen (16) selected distinct colors is closest to the original color of that pixel. Eq. 1, as described above, is used to make that determination. As a result, each pixel is now represented by a 4-bit color.

By assigning respective distinct colors to all the pixels within the original bitmap, the original bitmap is converted to a 4-bit bitmap. At step 20, the converted 4-bit bitmap is stored in the data buffer. At this point, the data buffer contains both the color map and the 4-bit bitmap.

The contents of the data buffer (including the color map and the 4-bit bitmap) are then further compressed by the PNG compression algorithm. The compressed data is then forwarded via the computer network to the intended destination(s). The color map and the 4-bit bitmap are sent to the intended destination(s) together. This is done to ensure that the 4-bit bitmap can be deciphered properly at the intended destination(s).

In the exemplary method as described above, each region is independently represented by sixteen (16) distinct colors. Therefore, while many regions may share the same distinct colors, there could be as many as 16*r distinct colors for a full image with r regions. In addition, it should be noted that when counting distinct colors, it is not necessary to count colors of every pixel. It is an option to count every p pixels, where p is an integer parameter.

Furthermore, it should also be noted that while the exemplary method as described above uses sixteen (16 or $2^4$) colors to represent a region, it will be appreciated by a person of ordinary skill in the art that the number of distinct colors that can be used to represent a region may vary depending on the system or design constraints and requirements.

In an exemplary embodiment, the present invention is implemented in the form of control logic and/or programming instructions using computer software. The control logic and/or programming instructions can be organized in an integrated or modular manner. Based on the disclosure provided herein, a person of ordinary skill in the art will be able to implement the present invention using computer software. Alternatively, the present invention can also be implemented using hardware.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for generating compressed video data to facilitate transmission of such data over a computer network, comprising:

applying a y-bit conversion method to a x-bit bitmap representing a region to generate a y-bit bitmap, where x is larger than y; and applying a PNG compression algorithm to the y-bit bitmap.

2. The method of claim 1 wherein the y-bit conversion method further comprises:

identifying a plurality of distinct colors in the region;

selecting from the plurality of distinct colors, n distinct colors with the highest occurring frequency, with n being less than or equal to $2^y$;

selecting from the remaining distinct colors within the plurality of distinct colors, $2^y$–n distinct colors;

generating a color map using the n and $2^y$–n selected distinct colors; and for each selected pixel in the x-bit bitmap, assigning one of the selected distinct colors to that pixel.

3. The method of claim 2 wherein y is the integer 4.

4. The method of claim 2 wherein each of the $2^y$–n distinct colors differs the most from the selected n distinct colors.

5. The method of claim 2 further comprising:

applying the PNG compression algorithm to the color map; and forwarding the compressed y-bit bitmap and the compressed color map to a destination over the computer network.

6. The method of claim 1 wherein the method is implemented using software.

7. A system for generating compressed video data to facilitate transmission of such data over a computer network, comprising:

control logic configured to apply a y-bit conversion method to a x-bit bitmap representing a region to generate a y-bit bitmap, where x is larger than y; and control logic configured to apply a PNG compression algorithm to the y-bit bitmap.

8. The system of claim 7 further comprising:

control logic configured to identify a plurality of distinct colors in the region;

control logic configured to select from the plurality of distinct colors, n distinct colors with the highest occurring frequency, with n being less than or equal to $2^y$;

control logic configured to select from the remaining distinct colors within the plurality of distinct colors, $2^y$–n distinct colors;

control logic configured to generate a color map using the n and $2^y$–n selected distinct colors; and control logic configured to assign one of the selected distinct colors to each selected pixel in the x-bit bitmap.

9. The system of claim 8 wherein y is the integer 4.

10. The system of claim 8 wherein each of the $2^y$–n distinct colors differs the most from the selected n distinct colors.

11. The system of claim 8 further comprising:

control logic configured to apply the PNG compression algorithm to the color map; and control logic configured to forward the compressed y-bit bitmap and the compressed color map to a destination over the compute network.

12. The system of claim 7 wherein the system is implemented using software.

13. A method for speeding up transmission of video data over a computer network, comprising:

identifying a plurality of distinct colors in a region, the region being made up of a plurality of pixels, each pixel being represented by a x-bit color;

selecting from the plurality of distinct colors, n distinct colors with the highest occurring frequency within the region, with n being less than or equal to $2^y$, where y is an integer, y is less than x, and $2^y$ represents the number of distinct colors to be used to represent the region;

selecting from the remaining distinct colors within the plurality of distinct colors, $2^y$–n distinct colors;

generating a color map using the n and $2^y$–n selected distinct colors; and generating a y-bit bitmap by assigning one of the selected distinct colors to each selected pixel in the region.

14. The method of claim 13 further comprising:

compressing the color map and the y-bit bitmap with a PNG compression algorithm; and forwarding the compressed color map and y-bit bitmap to a destination connected to the computer network.

15. The method of claim 13 wherein y is the integer 4.

16. The method of claim 13 wherein each of the $2^y$–n distinct colors differs the most from the selected n distinct colors.

17. The method of claim 13 wherein the method is implemented using software.

18. A system for speeding up transmission of video data over a computer network, comprising:

control logic configured to identify a plurality of distinct colors in a region, the region being made up of a plurality of pixels, each pixel being represented by a x-bit color;

control logic configured to select from the plurality of distinct colors, n distinct colors with the highest occurring frequency within the region, with n being less than or equal to $2^y$, where y is an integer, y is less than x, and $2^y$ represents the number of distinct colors to be used to represent the region;

control logic configured to select from the remaining distinct colors within the plurality of distinct colors, $2^y$–n distinct colors;

control logic configured to generate a color map using the n and $2^y$–n selected distinct colors; and control logic configured to generate a y-bit bitmap by assigning one of the selected distinct colors to each selected pixel in the region.

19. The system of claim 18 further comprising:

control logic configured to compress the color map and the y-bit bitmap with a PNG compression algorithm; and control logic configured to forward the compressed color map and y-bit bitmap to a destination connected to the computer network.

20. The system of claim 18 wherein y is the integer 4.

21. The system of claim 18 wherein each of the $2^y$–n distinct colors differs the most from the selected n distinct colors.

22. The system of claim 18 wherein the system is implemented using software.

23. A computer readable medium having embodied thereon a program, the program being executable by a machine to perform a method for generating compressed video data to facilitate transmission of such data over a computer network, the method comprising:

applying a y-bit conversion method to a x-bit bitmap representing a region to generate a y-bit bitmap, where x is larger than y; and applying a PNG compression algorithm to the y-bit bitmap.

24. A computer readable medium having embodied thereon a program, the program being executable by a machine to perform a method for speeding up transmission of video data over a computer network, the method comprising:

identifying a plurality of distinct colors in a region, the region being made up of a plurality of pixels, each pixel being represented by a x-bit color;

selecting from the plurality of distinct colors, n distinct colors with the highest occurring frequency within the region, with n being less than or equal to $2^y$, where y is an integer, y is less than x, and $2^y$ represents the number of distinct colors to be used to represent the region;

selecting from the remaining distinct colors within the plurality of distinct colors, $2^y$–n distinct colors;

generating a color map using the n and $2^y$–n selected distinct colors; and generating a y-bit bitmap by assigning one of the selected distinct colors to each selected pixel in the region.

* * * * *

UNITED STATES PATENT AND TRADEMARK OFFICE
CERTIFICATE OF CORRECTION

PATENT NO.         : 7,035,458 B1
APPLICATION NO. : 10/112637
DATED              : April 25, 2006
INVENTOR(S)        : Mark C.H. Chien It is certified that error appears in the above-identified patent and that said Letters Patent is hereby corrected as shown below:

In Column 3, Line 44 of the issued patent ,"assigned to the pixel that would which will minimize the" should read --assigned to the pixel which will minimize the--

Signed and Sealed this

Third Day of April, 2007

JON W. DUDAS
*Director of the United States Patent and Trademark Office*